R. J. HANNI.
LUGGAGE CARRIER FOR AUTOMOBILES.
APPLICATION FILED SEPT. 29, 1917.

1,261,520.

Patented Apr. 2, 1918.

WITNESS

INVENTOR
R. J. Hanni,

BY Victor J. Evans
ATTORNEY

UNITED STATES PATENT OFFICE.

RUDOLPH J. HANNI, OF GOFF, KANSAS.

LUGGAGE-CARRIER FOR AUTOMOBILES.

1,261,520.　　　　　Specification of Letters Patent.　　Patented Apr. 2, 1918.

Application filed September 29, 1917. Serial No. 193,998.

*To all whom it may concern:*

Be it known that I, RUDOLPH J. HANNI, a citizen of the United States, residing at Goff, in the county of Nemaha and State of Kansas, have invented new and useful Improvements in Luggage-Carriers for Automobiles, of which the following is a specification.

This invention relates to luggage carriers for motor vehicles and comprehends more particularly the provision of a skeleton rack adapted to be detachably supported on a running board of the car.

Another object of the invention is to provide a simple and inexpensive rack which may be quickly attached to and detached from an automobile and which will be found very useful as a carrier for produce of all kinds, grips, lunch baskets and the like.

The invention also aims to generally improve articles of this nature to render them more practical, useful and commercially desirable.

With these and other objects in view as will become more apparent as the description proceeds, the invention consists in certain novel features of construction, combination and arrangement of parts as will be hereinafter fully described, illustrated and claimed.

Figure 1:
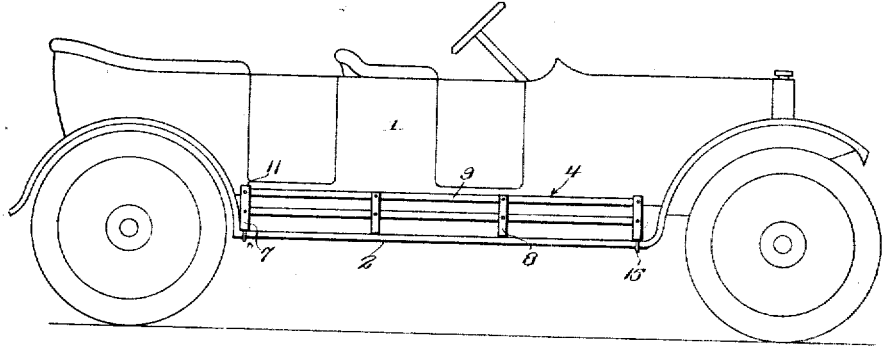
Figure 1 is a side elevation of an automobile showing the rack secured to the running board.

Referring in detail to the drawings by numerals, 1 designates a vehicle body, 2 the running board and 3 the running board shield which may be considered as part of the body. The invention aims to provide a rack 4 of skeleton formation which may be mounted on the running board and detachably connected to the shield and to the running board.

In the preferred construction of the rack or carrier, I provide a plurality of transverse bars arranged in parallel spaced relation and designated by the numerals 5 and 6. The outer ends of the bars are formed integrally with vertical side bars 7, 8 as shown. Longitudinal side bars 9 are riveted or otherwise secured to the side bars and serve to hold them in proper spaced relation. A longitudinal bottom bar 10 is riveted or otherwise secured to the under sides of the transverse bottom bars and holds the inner ends of the transverse bars 5 and 6 in proper spaced relation. The side bars 7 are formed integrally at their upper ends with arched end bars 11 which overlie the transverse bottom bars 5 and which are riveted to the said bottom bars and to the longitudinal bar 10 by the rivets 12. It will be noted that these rivets 12 also serve to secure the bars 5 to the bars 10.

The inner ends of the transverse bottom bars 5 and 6 are formed integrally with upwardly and inwardly inclined tongues 13 which are removably inserted in slots 14 formed in the running board shield 3 and which assist in securing the rack to the vehicle.

As a further securing means, I provide hooks 15 for engagement with the under side of the running board adjacent to its outer edge. The shanks 16 of the hooks extend upwardly through openings in the transverse bottom bars 5 and are encircled by expansive helical springs 17 which bear at their upper ends against the nuts 18 threaded on the shanks. By adjusting the position of the nuts the traction of the springs may be varied.

Figure 2:
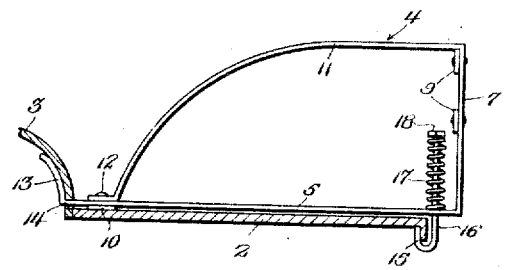
Fig. 2 is a vertical sectional view through the rack and vehicle showing the attachment of the rack thereto.
Figure 3:
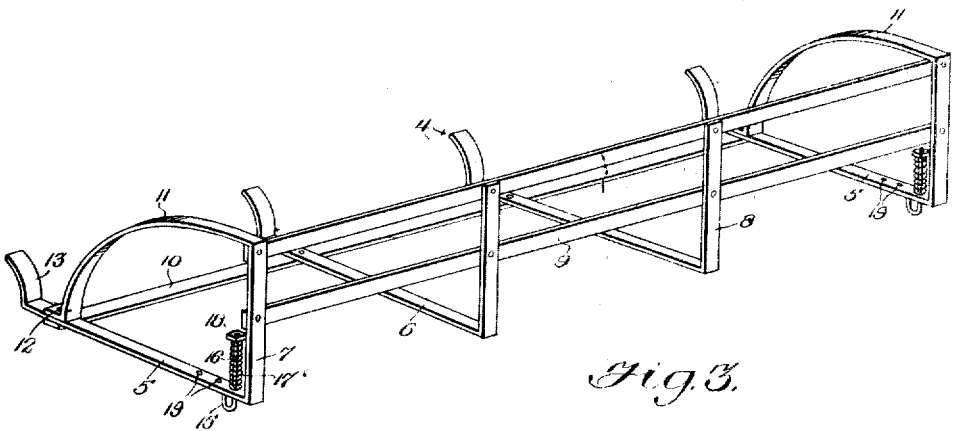
Fig. 3 is a perspective view of the rack.

In positioning the rack on the running board, it is first tilted to insert the tongue 13 in the slots 14 and then swung to its normal position after which the hooks 15 are brought into engagement with the outer edge of the running board as shown in Fig. 2. The rack is of simple and inexpensive construction, may be formed of any suitable material such as the flat metal strips here shown, and will prove very useful in the transportation of luggage of all description.

The transverse bars 5 may be provided with additional holes 19 through which the shanks 16 are passed so that the carrier may be accommodated upon different widths of running boards.

While I have shown and described the preferred embodiment of my invention, it will be clearly understood that I do not wish to be limited to this construction, but may make such changes as will fall within the scope and spirit of the invention as claimed.

What I claim is:—

1. A rack for vehicle running boards, comprising a plurality of transverse bottom bars, side bars rising from the outer ends of said bottom bars, longitudinal bars connecting said bottom and side bars in spaced relation, tongues formed on the inner ends of the bottom bars for detachable engagement with the vehicle, and means for detachably fastening the outer part of the rack to the outer edge of the running board.

2. A rack for vehicle running boards comprising a plurality of transverse bottom bars, side bars formed on the outer terminals of said bottom bars, longitudinal bars connecting said bottom bars and side bars in spaced relation, tongues formed on the bottom bars for detachable engagement with the vehicle body, hooks having shanks extending through certain of said bottom bars, nuts threaded on the upper terminals of said shanks, springs encircling the shanks and engaging with said nuts and the bottom bars, said hooks being adapted for detachable engagement with the under side of a running board.

In testimony whereof I affix my signature.

RUDOLPH J. HANNI.